(12) United States Patent  (10) Patent No.: US 7,515,585 B2
Rittmeyer et al.  (45) Date of Patent: Apr. 7, 2009

(54) DATA COMMUNICATION OPTIMIZATION

(75) Inventors: Bryan Rittmeyer, Sherman Oaks, CA (US); Yossi Maish, Sherman Oaks, CA (US)

(73) Assignee: IXIA, Calabasas, CA (US)

( * ) Notice: Subject to any disclaimer, the term of this patent is extended or adjusted under 35 U.S.C. 154(b) by 556 days.

(21) Appl. No.: 11/040,646

(22) Filed: Jan. 21, 2005

(65) Prior Publication Data

US 2006/0165076 A1 Jul. 27, 2006

(51) Int. Cl.
*H04J 3/06* (2006.01)
*H04L 12/66* (2006.01)
*H04B 1/44* (2006.01)
*G06F 15/16* (2006.01)

(52) U.S. Cl. ............... 370/389; 370/282; 370/352; 370/503; 709/232

(58) Field of Classification Search ......... 370/229–252, 370/282–389, 466–503, 390–432; 709/220–228, 709/250–251
See application file for complete search history.

(56) References Cited

U.S. PATENT DOCUMENTS

| 5,287,349 | A | * | 2/1994 | Hyodo et al. | 370/399 |
| 5,477,531 | A | * | 12/1995 | McKee et al. | 370/249 |
| 6,172,989 | B1 | | 1/2001 | Yanagihara et al. | |
| 6,310,884 | B1 | * | 10/2001 | Odenwald, Jr. | 370/412 |
| 6,393,025 | B1 | * | 5/2002 | Merritt | 370/395.6 |
| 6,449,252 | B1 | * | 9/2002 | Marsteiner | 370/230 |
| 6,490,264 | B1 | * | 12/2002 | Suzuki | 370/338 |
| 6,678,246 | B1 | * | 1/2004 | Smyth | 370/230 |
| 7,039,712 | B2 | * | 5/2006 | Valavi et al. | 709/228 |
| 7,145,879 | B1 | * | 12/2006 | Kasai | 370/241.1 |
| 2002/0027929 | A1 | * | 3/2002 | Eaves | 370/505 |
| 2004/0086000 | A1 | * | 5/2004 | Wallace et al. | 370/503 |
| 2004/0252686 | A1 | * | 12/2004 | Hooper et al. | 370/389 |
| 2005/0063405 | A1 | * | 3/2005 | Borsum et al. | 370/419 |
| 2005/0111487 | A1 | * | 5/2005 | Matta et al. | 370/468 |
| 2005/0220103 | A1 | * | 10/2005 | Wild et al. | 370/390 |
| 2006/0050825 | A1 | * | 3/2006 | Page | 375/356 |
| 2006/0182423 | A1 | * | 8/2006 | Noritake | 386/112 |
| 2006/0215695 | A1 | * | 9/2006 | Olderdissen | 370/469 |
| 2006/0215697 | A1 | * | 9/2006 | Olderdissen | 370/469 |
| 2006/0239300 | A1 | * | 10/2006 | Hannel et al. | 370/503 |
| 2007/0053349 | A1 | * | 3/2007 | Rittmeyer et al. | 370/378 |
| 2007/0115833 | A1 | * | 5/2007 | Pepper et al. | 370/241 |
| 2007/0291654 | A1 | * | 12/2007 | Pepper | 370/252 |

* cited by examiner

*Primary Examiner*—Man Phan
(74) *Attorney, Agent, or Firm*—SoCal IP Law Group LLP; Steven C. Sereboff; Mark Andrew Goldstein (57) ABSTRACT

Data communication optimization is disclosed. In a method, when data transmission is requested, an outgoing data unit is prepared with dummy payload data. In a method, when data reception is requested, the header and validation information from an incoming data unit is provided while the payload of the data unit is ignored. The methods cause an increase in the throughput of a network card when transmitting and/or receiving a data units having a large payload. The methods may be achieved on a hardware device included on a board in a network testing system and/or with associated software.

17 Claims, 6 Drawing Sheets

DATA COMMUNICATION OPTIMIZATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to network communications.

2. Related Art

Networks such as the Internet carry a variety of data communicated using a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate the how well a network or portion of thereof handles streaming media and voice communications.

DETAILED DESCRIPTION OF THE INVENTION

Throughout this description, the embodiments and examples shown should be considered as exemplars, rather than limitations on the apparatus and methods described.

A System

Figure 1:
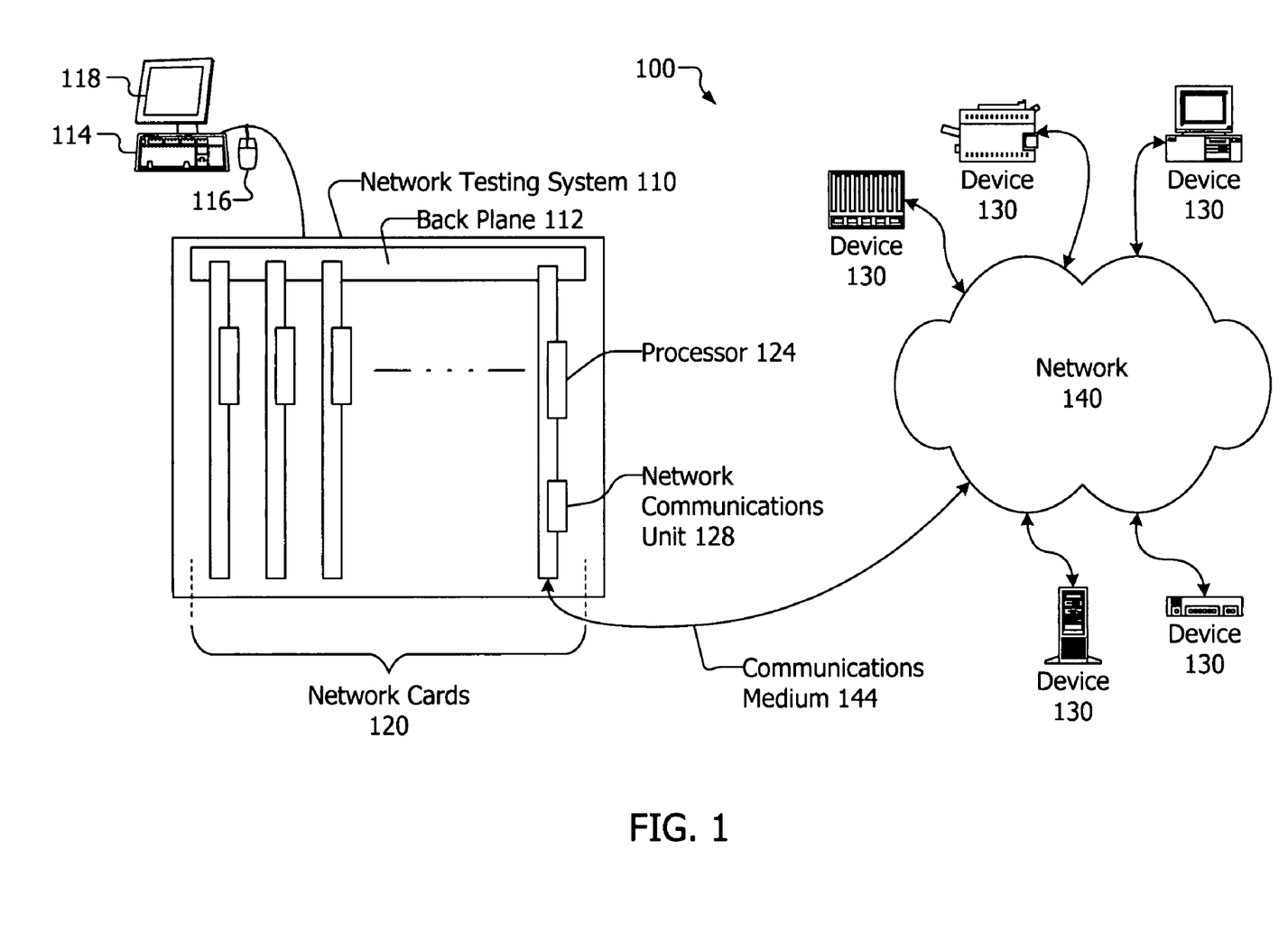
FIG. 1 is a block diagram of an environment in which data communication optimization may be implemented.

FIG. 1 is a block diagram of an environment 100 in which a method of data communication optimization is included in network cards in a network testing system. The environment includes network testing system 110 coupled via a network card 120 to a network 140 over a communications medium 144. The network testing system 110 may include or be one or more of a performance analyzer, a conformance validation system, a network analyzer, a packet blaster, a network management system, a combination of these, and/or others. The network testing system may be used to evaluate and/or measure characteristics and performance of a communication line or system, including the throughput of network traffic, the number of dropped packets, jitter, and many others. Such testing may be used to evaluate the Mean Opinion Score (MOS) of voice transmission over a network or portion thereof. The network testing system may be used to evaluate the performance of servers, networking devices such as, for example, routers, gateways, load sharers, and others, as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fibre optic cable, and coaxial cable, and may be wireless.

The network testing system 110 and the network cards 120 may support one or more well known higher level communications standards or protocols such as, for example, one or more versions of the User Datagram Protocol (UDP), Transmission Control Protocol (TCP), Real-Time Transport Protocol (RTP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The back plane 112 may serve as a bus or communications medium for the network cards 120. The back plane 112 may also provide power to the network cards 120.

The network testing system 110 may have a computer 100 coupled thereto. The computer 100 may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, applications running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for data units to travel.

Communications on the network 140 may take various forms, including frames, cells, datagrams, packets, higher level logical groupings of data, or other units of information, all of which are referred to herein as data units. Those data units that are communicated over a network are referred to herein as network traffic. The network traffic may include data units that represent electronic mail messages, computer files, web pages, graphics, documents, audio and video files, streaming media such as music (audio) and video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment network such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

Figure 2:
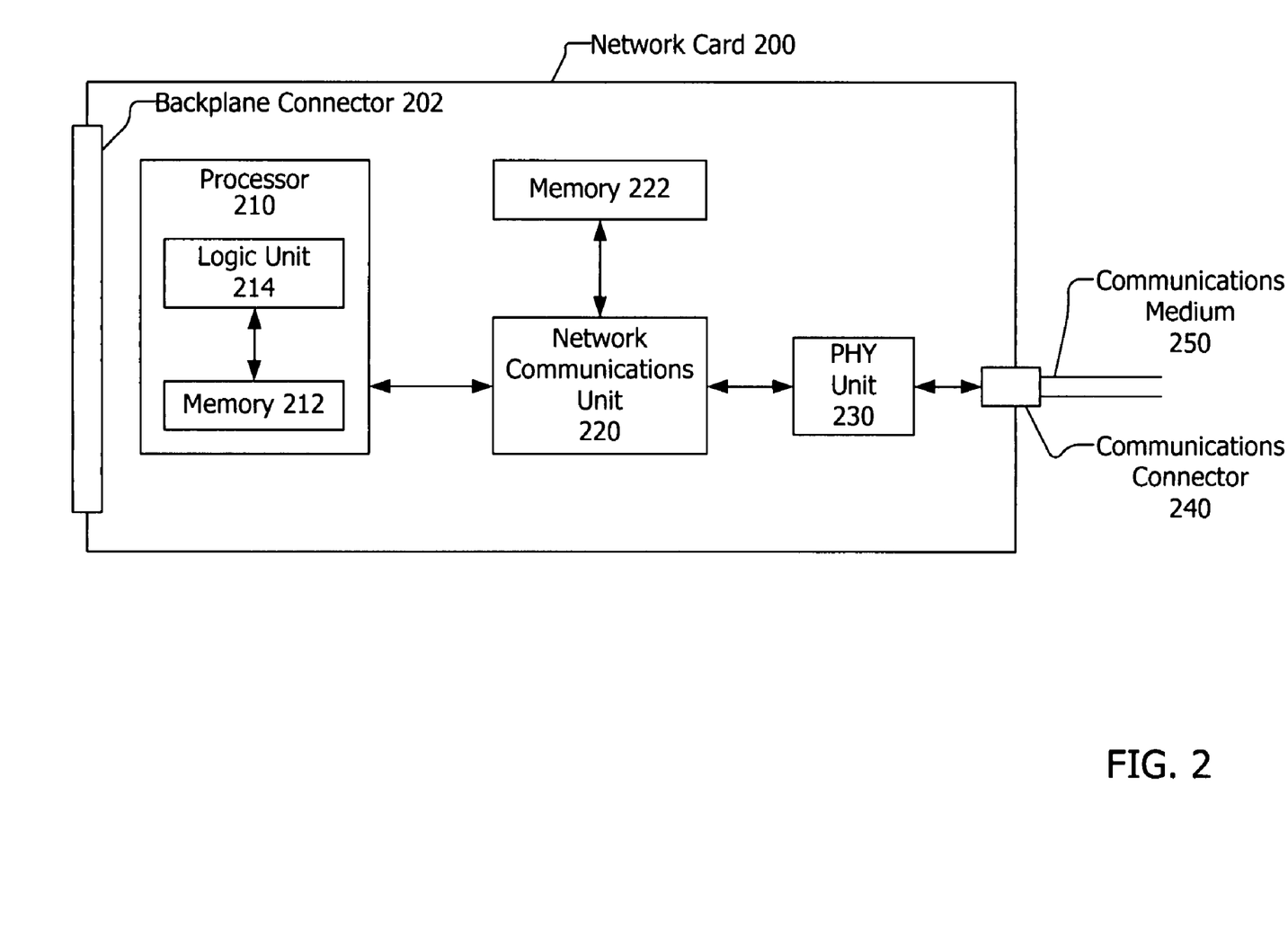
FIG. 2 is a block diagram of a network card.

FIG. 2 is a block diagram of a network card 200. The network card 200 may include hardware, software, firmware, and/or a combination thereof. The network card may include a processor 210, a network communications unit 220, a PHY unit 230, a memory unit 222, a backplane connector 202, and a communications connector 240. The network card 200 may have one or more network communications units 220 and a corresponding number of PHY units 230 and communications connectors 240. The network card 200 may also have one or more memory units 212 and one or more processors 210 included thereon. The network card 200 may include an operating system or a real-time operating system.

The backplane connector 202 may allow the network card 200 to be coupled with a network testing system such as networking testing system 110. The network card 200 may include a processor 210 and memory 212 such as, for example, random access memory (RAM) which maybe SDRAM or other commonly available or proprietary memory. The processor 210 may be a multipurpose processor, such as, for example, a PowerPC® processor available from IBM, Inc., and may be a specialized processor. The processor 210 may include a cache memory 212 and an arithmetic logic unit 214 or other logic unit. The processor 210 may be coupled with the network communications unit 220. The processor is capable of executing instructions which maybe located in a local memory, other storage medium, or other local or remote storage device.

The network card 200 may include and/or have access to local and/or remote memory, storage media and storage devices. Instructions to be executed by the processor may be stored on and executed from any local or remote machine readable medium or storage device. A machine readable medium includes, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, DVD drives, flash memory devices, and others.

The network communications unit 220 may include one or more circuits, chips, logic, firmware and/or instructions that allow for communication over a network according to the optimized data unit communications techniques described herein. The network communications unit 220 may be implemented as one or more FPGAs. The memory 222 may be included in network communications unit 220. The network communications unit 220 may also be implemented or included on one or more ASICs, silicon devices, integrated circuits, specialized processors such as a network processor, or other devices. The memory 222 may be replaced by an FPGA having memory or other storage included therein. The network communications unit 220 may be coupled with the PHY unit 230.

The PHY unit 230 provides for and supports lower level communications according to the Open System Interconnection (OSI) model physical or PHY layer. The PHY unit 230 provides for and supports one or more lower level communications as set forth above, including Ethernet, ATM, SONET, and various wireless standards including, for example, IEEE 802.11. The PHY unit 230 may include support for sub-layers within the PHY layer of the OSI model. These layers may be the Physical Coding Sub-layer (PCS), the Physical Medium Attachment sub-layer (PMA), and the Physical Media Dependent sub-layer (PMD).

The PHY unit 230 may be coupled with a communications medium 250 via communications connector 240. The communications connector 240 may be coupled between the network communications unit 220 and the communications medium 250. The communications medium 250 may be a wire such as Ethernet cabling, coaxial cable, fibre optic cable, and others, and may be wireless.

Additional and fewer units, hardware and firmware may be included in the network card 200 to achieve the optimized communication technique described herein.

Figure 3:
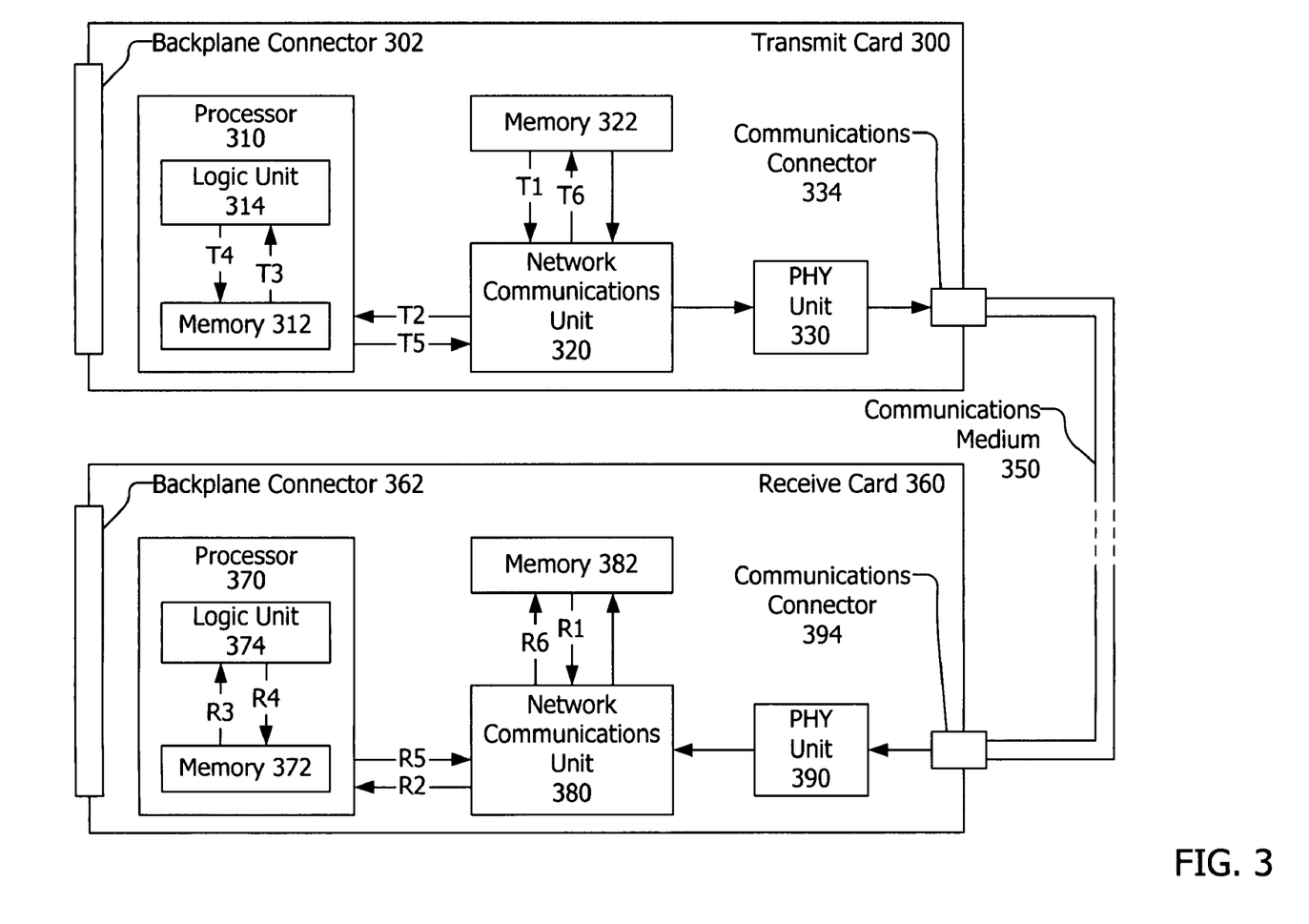
FIG. 3 is a block diagram of two cards, one transmitting data units and the other receiving data units.

FIG. 3 is a block diagram of two network cards, transmit card 300 and receive card 360. The transmit card 300 and the receive card 360 are both the same type of card and are labeled "transmit" and "receive" for illustrative purposes. The transmit card 300 and the receive card 360 are both capable of transmission of and receipt of data units, and are like network card 200 shown in and described regarding FIG. 2. Transmit card 300 and receive card 360 may be the same card 200 or may be two different cards 200. In another embodiment, specialized transmit and receive cards may be implemented and may each incorporate portions of the optimized network communications techniques described herein.

The transmit card 300 includes a backplane connector 302 for connection to a chassis, personal computer or other computing device. The transmit card 300 includes a communications connector 334, a PHY unit 330, a network communications unit 320, a memory 322 and a processor 310. The processor 310 includes a memory 312 and a logic unit 314. When the processor 310 receives a command to transmit a data unit, the processor 310 causes payload data to transferred from memory 322 to network communications unit 320 to memory 312 to logic unit 314, shown as transfer operations T1, T2 and T3. The logic unit 314 segments or packetizes the payload data into individual data units that include header data and payload data which are then transferred from logic unit 314 to memory 312, to network communications unit 320 and then to memory 322, shown as data transfer operations T4, T5 and T6. As a preliminary step, the processor 310 may have caused payload data to be transferred from a memory external to the processor to the memory 312 and/or to memory 322. The network communications unit 320 prepares a checksum and/or other validation information for the data unit. When the transmit card 300 prepares an outgoing data unit for transmission, the network communications unit 320 may prepare validation information including calculating a checksum of the data unit, validating the data unit using a cyclic redundancy check (CRC), evaluating a frame check sequence (FCS), and/or performing other error detection, verification and validation of the outgoing data unit. The checksum and/or other validation information may be computed in the hardware of the network communications unit 320, in the processor 310 and/or in software. The network communications unit 320 passes the data unit to the PHY unit 330 for transmission on communications medium 350.

The transfer of all of the information required for a data unit and, in particular, its payload may take sufficient time so as to serve as a bottleneck that reduces the throughput of the transmit card 300. This is shown as transfer T5. In addition, in some circumstances, the preliminary step in which the processor 310 causes payload data to be transferred from a memory external to the processor to the memory 312 also causes delay and may take sufficient time so as to serve as a bottleneck that reduces the throughput of the transmit card 300.

The receive card 360 includes a backplane connector 362 for connection to a chassis, personal computer or other computing device. The receive card 360 includes a communications connector 394, a PHY unit 390, a network communications unit 380, a memory 382 and a processor 370. The processor 370 includes a memory 372 and a logic unit 374. When receive card 360 receives a data unit, the network communications unit 380 receives the data unit from the PHY unit 330 which receives the data unit from communications medium 350. The network communications unit 380 places the data unit in memory 382. The network communications unit 380 may validate the checksum of the data unit and/or otherwise verify the data unit using a CRC, FCS, and/or performing other error detection, verification and validation of the incoming data unit. The checksum and/or other validation information may be computed in the hardware of the network communications unit 380, in the processor 370 and/or in software.

The entire data unit is then transferred to the processor 370. This is achieved by transferring the data unit from memory 382 to the network communications unit 380, shown as R1, to memory 372, shown as R2 and to logic unit 374, shown as R3. This transfer shown as R1, R2 and R3 includes header information and the payload. If the entirety of the payload cannot be transferred in one cycle, iteration or otherwise as a single entity, a request for the remainder of the payload or the next portion of the payload is made from the logic unit 374 to memory 372, shown as R4, to the network communications unit 380, shown as R5, and then to memory 382, shown as R6. The transfer of the remainder of the payload proceeds according to transfer operations R1, R2 and R3.

The transfer of all of the information required for a data unit and, in particular, its payload may take sufficient time so as to serve as a bottleneck that reduces the throughput of the receive card 360. This is shown as transfer operations R1, R2 and R3. In addition, there is processing overhead incurred when managing the receipt of a payload that is large as shown by the request for a further portion of the payload shown as R4, R5 and R6.

Figure 4:
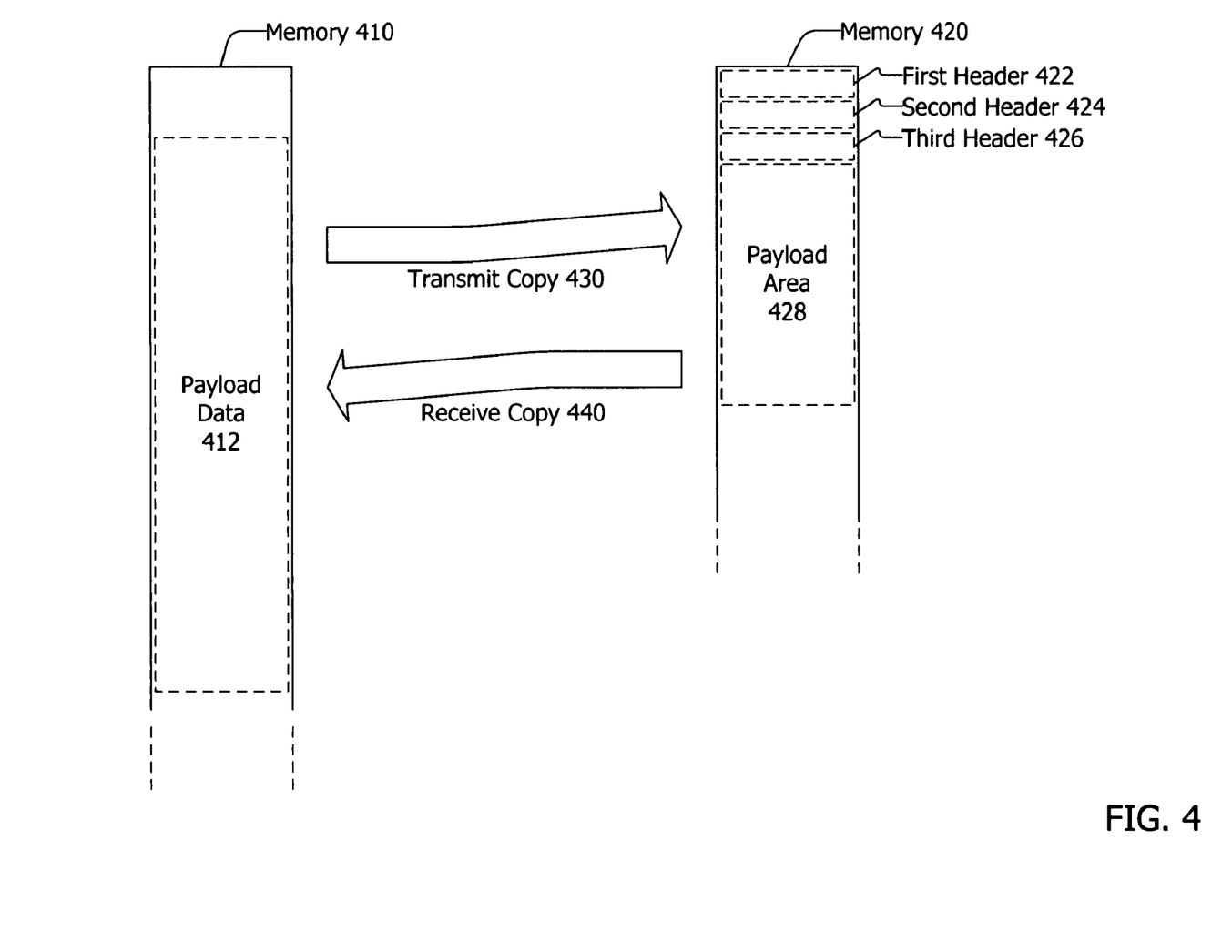
FIG. 4 is a block diagram of the contents of memory locations containing the payload and other portions of a data unit.

FIG. 4 is a block diagram of the contents of memory locations containing the payload and other portions of a data unit. When preparing a data unit to be transmitted onto a network, the payload data 412 is typically copied 430 from a first memory, memory 410, to a data unit payload area 428 in a second memory, memory 420. In one embodiment, the first memory is accessible to or included in a processor while the second memory is included in or accessible to a network communications unit. When the amount of payload data 412 is large, significant time may be needed to perform the copy 430. A request to transmit a large amount of payload may result in the segmentation of or packetization of the payload data into two or more data units. That is, when the amount of payload data 412 is large, multiple data units may be prepared to accommodate the entirety of the payload data. The amount of data required of the headers included in a data unit may be small in comparison to the amount of payload data 412. The headers may include a first header 422, a second header 424, a third header 426 and other headers. The headers are based on the protocol or protocols used, which may be one or more of the higher and lower level communications protocols referenced above or other communications protocols. In one embodiment, the first header 422 is an Ethernet header, the second header 424 is an IP header, and the third header 426 is a TCP header. Therefore, the overhead in copying a large data unit payload reduces the throughput of the transmission of a sequence of data units having a large payload, where throughput may be measured, for example, in kilobytes per second or data unit per second.

Similarly, when receiving a data unit from a network, the payload data in payload area 428 is typically copied 440 from a memory 420 in or accessible to a processor to a payload data area 412 in memory 410 in or accessible to a network communications unit. When the amount of payload data 412 is large, significant time may be needed to perform the copy 440. The amount of data required of the headers included in a data unit may be small in comparison to the amount of payload data. Therefore, the overhead in copying a large data unit payload reduces the throughput of the receipt of a sequence of data units having a large payload, where throughput may be measured, for example, in kilobytes per second or data unit per second.

When performing testing of a network, network devices, network applications and performing other related network hardware and software testing, large groups of data units having large payloads may be sent and/or received. The sending and/or receiving of large groups of data units having large payloads may be used to stress test or max out one or more network components, network applications, and/or other network device or software. Because the contents of the payload may be unimportant in certain testing scenarios, "don't care" or dummy data may be placed in the payload area of data units. When dummy data is used, the payload of a data unit to be transmitted need not be provided by the processor on the network card to the network communications unit on the network card. As such, no payload data need be copied from the memory accessible to or included in the processor to the memory included in or accessible to the network communications unit. The network communications unit can populate the payload area of a data unit with any data or no data. When dummy data is used, the payload of a received data unit need not be sent to a processor on a network card. The payload of a data unit sent with dummy or no payload data may be ignored.

To increase the throughput when transmitting and/or receiving data units having a large payload in certain testing situations, the copying of payload data between a first memory and a second memory may be eliminated. The sending and receiving of dummy data may be achieved by providing a new software interface, by adding a flag as an argument to an existing software interface, by including a flag or data field internal to the data unit, and by other techniques. For example, a READIGNORE and/or a WRITEIGNORE flag may be included in a header of a data unit. For example, a READIGNORE and/or a WRITEIGNORE flag may be added as an argument when calling an existing routine such as a set socket option routine, namely the well known "setsockopt" routine available in Microsoft Windows and Unix operating systems. More specifically, setsockopt(sock_fd, SOL_TCP, READIGNORE,
&count, sizeof(count));

and/or setsockopt(sock_fd, SOL_TCP, WRITEIGNORE,
&count, sizeof(count));

Using the setsockopt routine in this way may require rewriting or amending the software of the setsockopt routine in the operating system. In another embodiment, a readignore( ) and/or a writeignore( ) routine may be added to existing operating system software.

Figure 5:
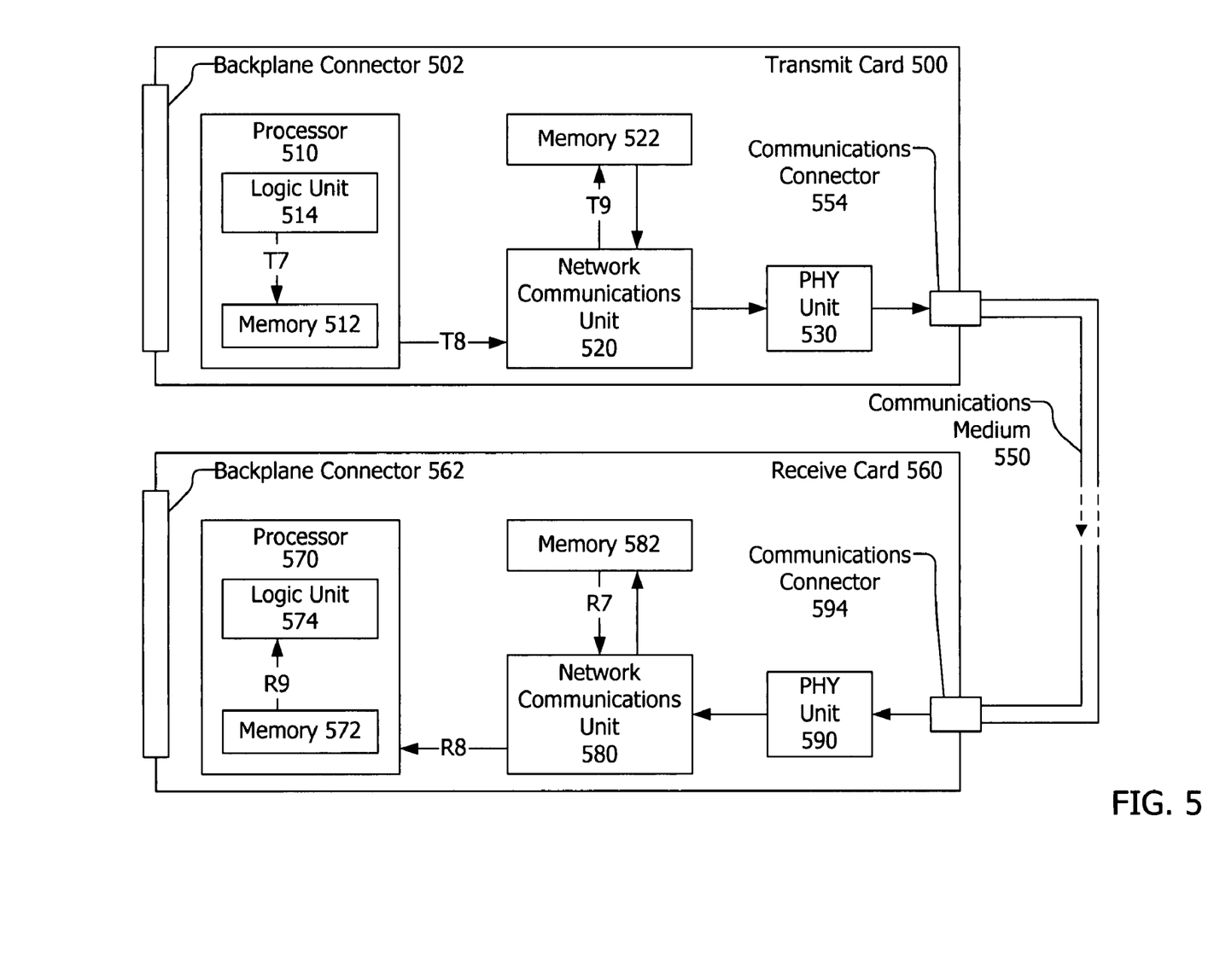
FIG. 5 is a block diagram of two network cards, one transmitting data units and the other receiving data units.

FIG. 5 is a block diagram of two network cards, transmit card 500 and receive card 560. The transmit card 500 and the receive card 560 are both the same type of card and are labeled "transmit" and "receive" for illustrative purposes. The transmit card 500 and the receive card 560 are both capable of transmission of and receipt of data units, and are like network card 200 shown in and described regarding FIG. 2. Transmit card 500 and receive card 560 may be the same card 200 or may be two different cards 200. In another embodiment, specialized transmit and receive cards may be implemented and may each incorporate portions of the optimized network communications techniques described herein.

The transmit card 500 includes a backplane connector 502 for connection to a chassis, personal computer or other computing device. The transmit card 500 may include a communications connector 534, a PHY unit 530, a network communications unit 520, a memory 522 and a processor 510. The processor 510 may include a memory 512 and a logic unit 514. According to the technique described herein, when processor 510 receives instructions to transmit a data unit having WRITEIGNORE set, flagged or otherwise activated or specified, no payload of the data unit is transferred from the memory 522 to the network communications unit 520, to memory 512, and to logic unit 514. The only data that is transferred from processor 510 to memory 522 via logic unit 514, memory 512, network communications unit 520 is header information, shown by labels T7, T8 and T9. In one embodiment, the payload of the data unit is copied from a location in memory 522 with "don't care" or dummy data of the size required or specified in the header information or otherwise specified by the processor 510 to the network communications unit 520. In another embodiment, the network communications unit 520 may generate data for inclusion as the payload. This payload data generation may be achieved, for example, by random number generation techniques, patterned data generation techniques, and others. In one embodiment, the payload data is re-used in multiple data units, so that the generation or copying of "don't care" data need not be performed for every data unit, and may only be performed for a limited number of data units. When re-using payload data, only the header information may differ among a series of transmitted data units. In yet another embodiment, no payload data may be used so that an empty payload is prepared and used in the data unit. Even though dummy data, including no data, is included as the payload of the data unit, the header information conforms to the particular communications protocols used.

The network communications unit 520 may prepare a checksum and/or other validation information for the data unit, and the data unit is passed to the PHY unit 530 for transmission on communications medium 550. In one embodiment, the checksum and/or other validation information is computed in the hardware of the network communications unit 520 and not in the processor 510 and not in software. In another embodiment, the checksum and/or other validation information is computed in the processor 510 and/or in software. The network communications unit 520 passes the outgoing data unit to the PHY unit 530 for transmission on communications medium 550.

The technique described in the prior paragraph eliminates the transfer of the information required for a data unit payload from the processor 510 to the memory 522. This technique corresponds to removing the transmit copy operation 430 shown in FIG. 4. This technique removes data transfer operations T4, T5 and T6 of FIG. 3 and replaces them with data transfer operations T7, T8 and T9. As only the header information is moved from the processor 510 to the memory 522, when large payloads are used, the delay in transferring the payload that is present in the functioning described regarding FIG. 3 is removed. The throughput increase is particularly apparent when a sequence of large payload data units is transmitted.

Moreover, the throughput gain is further increased when re-using payload data in multiple data units. The re-usability of payload data reduces the number of times don't care data need be copied from memory to the network communications unit or reduces the number of times dummy data needs to be generated by the network communications unit.

In addition, the delay in those circumstances where the preliminary step of the processor causing payload data to be transferred from a memory external to a processor to a memory in the processor and/or to a memory accessible to the network communications unit is also eliminated because the payload data need not be transferred as dummy data is to be used. The elimination of this preliminary step also contributes to a throughput increase in the transmit card 500.

The receive card 560 may include a backplane connector 562 for connection to a chassis, personal computer or other computing device. The receive card 560 may include a communications connector 594, a PHY unit 590, a network communications unit 580, a memory 582 and a processor 570. The processor 570 includes a memory 572 and a logic unit 574. When receive card 560 receives a data unit, the network communications unit 580 receives the data unit from the PHY unit 590 which receives the data unit from communications medium 550. The network communications unit 580 places the data unit in memory 582. The network communications unit 580 may verify the checksum of the data unit and/or otherwise validate the data unit using a CRC, FCS, and/or performing other error detection, verification and validation of the data unit. In one embodiment, the checksum and/or other validation information is computed in the hardware of the network communications unit 580 and not in the processor 570 and not in software. In another embodiment, the checksum and/or other validation information is computed in the processor 570 and/or in software. The header information from the data unit and results of the validation are then transferred to the processor 570. This is achieved by transferring the header information of the data unit from memory 582 to the network communications unit 580, shown as R7, to memory 572, shown as R8 and to logic unit 574, shown as R9. This transfer shown as R7, R8 and R9 excludes data from the payload of the data unit. In addition meta data concerning the data unit may be prepared and transferred to the processor 570 in addition to an/or along with the header information. The meta data may include information such as, for example, the length of the payload, the same or additional validation information, and other information about the payload of the data unit.

The technique described in the prior paragraph eliminates the transfer of the data unit payload from the memory 582 to the processor 570. This technique corresponds to removing the receive copy operation 440 shown in FIG. 4. This technique removes receive data transfer operations R1, R2 and R3 of FIG. 3 and replaces them with receive data transfer operations R7, R8 and R9. When large payloads are used, the removal of the time required in transferring the payload that is present in the functioning described regarding FIG. 3 increases the throughput of the receive card 560. The throughput increase is particularly apparent when a sequence of large payload data units is received. In addition actions and operations involved in obtaining one or more remaining portions of a payload shown as labels R4, R5, and R6 in FIG. 3 are eliminated in FIG. 5.

Additional and fewer units, hardware and firmware may be included in the transmit card 500 and the receive card 560 to achieve the optimized communications described herein.

The Methods

Figure 6A:
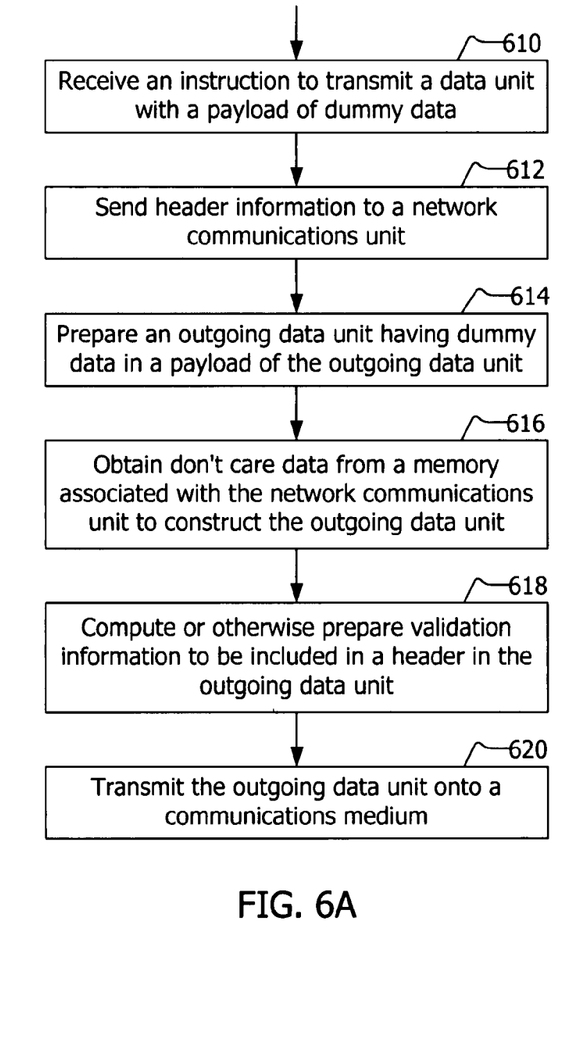
FIG. 6A is a flow chart of the actions taken according to a method of transmitting data units.
Figure 6B:
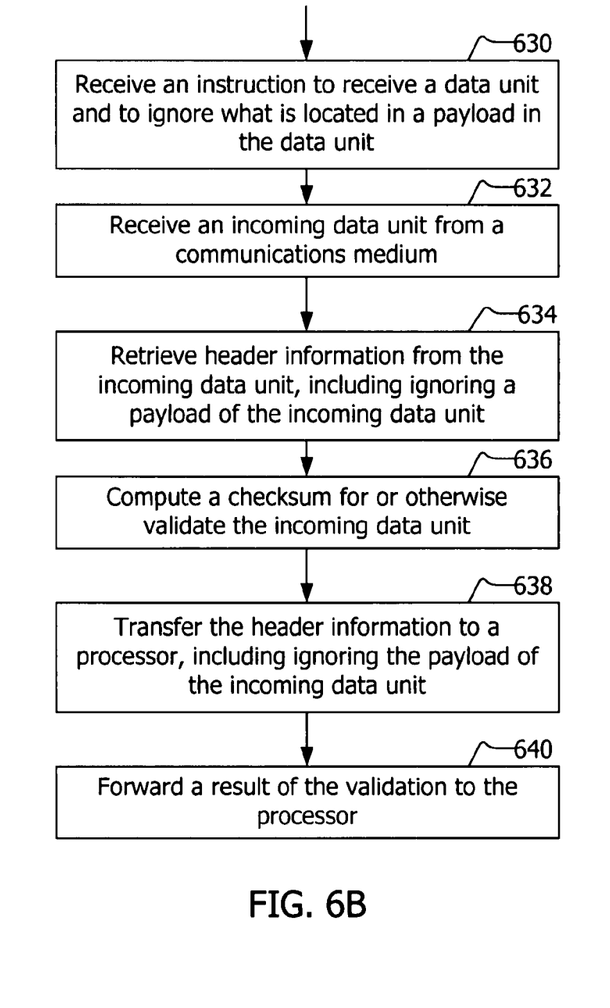
FIG. 6B is a flow chart of the actions taken according to a method of receiving data units.

FIG. 6A is a flow chart of a method of transmitting data units, and FIG. 6B is a flow chart of a method of receiving data units. These methods may be implemented on one or more FPGAs and/or other hardware devices, such as, for example, network cards 120 and 200, transmit card 520 and receive card 580, as shown in FIGS. 1, 2 and 5.

Referring to FIG. 6A, when transmitting data units according to the optimized data communication technique described herein, the method may include the processor receiving an instruction to transmit a data unit with a payload of dummy data, as shown in block 610. The processor may send header information to a network communications unit, as shown in block 612. The network communications unit may prepare an outgoing data unit having dummy data in a payload of the outgoing data unit, as shown in block 614. The preparing may include obtaining don't care data from a memory associated with the network communications unit to construct the outgoing data unit, as shown in block 616, may include generating data to be included in the payload of the outgoing data unit, and may include using no data or an empty payload. The preparing may also include re-using payload data from a previously prepared data unit. The preparing may also include computing or otherwise preparing validation information such as, for example, a checksum, CRC, FCS, or other information to be included in a header in the outgoing data unit, as shown in block 618. The computing or otherwise preparing validation information may be performed in hardware in a network communications unit, in a processor or in software. The checksum or other validation information may be computed or otherwise prepared while the don't care data is being copied from a memory to the network communications unit, while data is generated for the payload, or after the network communications unit has received the entirety of the payload data. The network communications unit may transmit the outgoing data unit onto a communications medium, as shown in block 620.

Referring to FIG. 6B, When receiving data units according to the optimized data communication technique described herein, the method may include receiving an instruction to receive a data unit and to ignore what is located in a payload in the data unit, as shown in block 630. The receiving may include a processor reading an instruction and/or a network communications unit receiving one or more instructions from the processor. An incoming data unit is received from a communications medium, as shown in block 632. Header information may be retrieved from the incoming data unit, the retrieving including ignoring a payload of the incoming data unit, as shown in block 634. Information included in the incoming data unit may be validated, such as, for example by computing a checksum, performing a CRC, evaluating a FCS, or other validation, as shown in block 636. The computing or otherwise calculating validation information may be performed in hardware in a network communications unit, in a processor or in software. The checksum or other validation information may be computed or otherwise prepared while payload is being received from a PHY unit or after the network communications unit has received the entirety of the payload data. The header information may be transferred to a processor, the transferring including ignoring the payload of the incoming data unit, as shown in block 638. The transferring may include forwarding a result of the validating to the processor, 640. In addition, meta data concerning the data unit may be prepared and transferred to the processor in addition to and/or along with the header information. The meta data may include information such as, for example, the length of the payload, the same or additional validation information, and other information about the payload of the data unit.

With regard to FIGS. 6A and 6B, additional and fewer steps may be taken, and the steps as shown may be combined or further refined to achieve the methods described herein.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

The invention claimed is:

1. A method comprising:
   receiving in a processor in a network card an instruction to transmit a data unit with a payload of dummy data
   the processor sending header information to a network communications unit
   preparing in the network communications unit an outgoing data unit having dummy data in a payload of the outgoing data unit, including the network communications unit computing validation information and placing the validation information in a header in the outgoing data unit
   the network communications unit transmitting the outgoing data unit onto a communications medium.

2. The method of claim 1 wherein the preparing comprises:
   the network communications unit obtaining don't care data from a memory associated with the network communications unit to construct the dummy data for the payload of the outgoing data unit.

3. The method of claim 1 wherein the preparing comprises:
   generating data in the network communications unit to construct the dummy data for the payload of the outgoing data unit.

4. The method of claim 1 wherein the preparing comprises:
   the network communications unit using no data to construct the dummy data such that the payload of the outgoing data unit is empty.

5. The method of claim 1 wherein the computing validation information comprises:
   calculating in the network communications unit a checksum to be included in the header in the outgoing data unit.

6. A method comprising:
   a network communications unit in a network card receiving from a processor included in the network card an instruction to receive a data unit and to ignore what is located in a payload in the data unit
   the network communications unit receiving an incoming data unit from a communications medium
   the network communications unit verifying validation information included in the incoming data unit
   the network communications unit retrieving header information from the incoming data unit, the retrieving including ignoring a payload of the incoming data unit
   the network communications unit transferring the header information to the processor, the transferring including ignoring the payload of the incoming data unit.

7. The method of claim 6 wherein the verifying validation information comprises:
   the network communications unit verifying in hardware a checksum included in the incoming data unit.

8. The method of claim 7 wherein the transferring includes:
   the network communications unit forwarding a result of the verifying to the processor.

9. A network testing system comprising a plurality of network cards, at least one network card of the plurality of network cards including:
   a processor
   a hardware device coupled with the processor and coupled with a memory, the hardware device configured to handle network communications and to perform actions comprising:
       receiving an instruction from the processor to transmit a data unit with a payload of dummy data
       receiving header information from the processor
       preparing an outgoing data unit having dummy data in a payload of the outgoing data unit
       preparing validation information
       placing the validation information in a header in the outgoing data unit
       transmitting the outgoing data unit onto a communications medium.

10. The network testing system of claim 9 wherein the preparing the outgoing data unit comprises:
    obtaining don't care data from the memory to construct the dummy data for the payload of the outgoing data unit.

11. The network testing system of claim 9 wherein the preparing the outgoing data unit comprises:
    generating data to construct the dummy data for the payload of the outgoing data unit.

12. The network testing system of claim 9 wherein the preparing the outgoing data unit comprises:
    using no data to construct the dummy data such that the payload of the outgoing data unit is empty.

13. The network testing system of claim 9 wherein the preparing validation information comprises:
    calculating in the hardware device a checksum to be included in the header in the outgoing data unit.

14. The network testing system of claim 9 wherein the transmitting comprises:
    providing the outgoing data unit to a physical (PHY) layer unit.

15. A network testing system comprising a plurality of network cards, at least one network card of the plurality of network cards including:

a processor a hardware device coupled with the processor and having a memory, the hardware device configured to handle network communications and to perform actions comprising:

receiving an instruction to receive a data unit and to ignore what is located in a payload in the data unit receiving an incoming data unit from a communications medium verifying validation information included in the incoming data unit retrieving header information from the incoming data unit, the retrieving including ignoring a payload of the incoming data unit.

transferring the header information to the processor, the transferring including ignoring the payload of the incoming data unit.

16. The network testing system of claim 15 wherein the the verifying validation information comprises:

verifying in the hardware device a checksum included in the incoming data unit.

17. The network testing system of claim 16 wherein the transferring includes:

forwarding a result of the verifying to the processor.

* * * * *